United States Patent Office 2,876,197
Patented Mar. 3, 1959

2,876,197

COMPONENT FOR WELL TREATING FLUID

Thomas E. Watkins, Arlington, Tex., assignor, by mesne assignments, to Socony Mobil Oil Company, Inc., New York, N. Y., a corporation of New York No Drawing. Application August 15, 1955
Serial No. 528,509

7 Claims. (Cl. 252—8.5)

This invention relates to emulsions and relates more particularly to emulsions for use in wells.

In the drilling or in the treatment of wells, fluids find important use. For example, in the rotary drilling of wells, such as those for petroleum oil or gas, a fluid is continuously circulated from the surface of the ground to the bottom of the well bore hole and back to the surface of the ground again. The fluid, termed a drilling fluid, has various functions including those of lubricating the drill bit and pipe, carrying cuttings from the bottom of the well bore hole to the surface of the ground, and imposing a hydrostatic head on the drilled formation to prevent escape of oil, gas, or water therefrom into the well bore hole during the drilling operations. Ordinarily, aqueous drilling fluids comprising a suspension of a clay in water are employed. Aqueous drilling fluids are limited in the extent to which their specific gravities can be reduced and, where reduced specific gravities are required, drilling fluids having a fluid phase consisting entirely of oil or consisting of an emulsion of oil and water can be used.

Emulsion drilling fluids are less expensive and are more convenient to handle than drilling fluids having a fluid phase consisting entirely of oil. Therefore, of these two types, the emulsion drilling fluids are usually preferred. Oil-in-water drilling fluids have been used extensively. In these drilling fluids, water is the continuous phase of the emulsion. However, water-in-oil emulsion fluids, i. e., drilling fluids wherein the continuous phase of the emulsion is oil, have been recognized to possess advantages over the oil-in-water types of fluid. As a result, water-in-oil emulsion drilling fluids are coming into greater use.

Emulsions for use in treatment of wells, particularly drilling fluids, contain in addition to the oil and water an agent to assist in stabilization of the emulsion, called an emulsifying agent, and a solid material to impart desirable properties of viscosity and density to the emulsion. It has been proposed to employ in the preparation of these emulsions a dry mix comprising emulsifying agent and the solid material. With such a dry mix, water and oil may be added thereto and the emulsion fluid thereby formed. Thus, a supply of emulsifying agent separate from the solid material need not be maintained and problems of storage and material handling are minimized. Considerations of economy demand that dry mixes be sold and stored in paper sacks. Upon stacking of such containers in storage warehouses and the like, the dry mix contained therein is subjected to varying compressive forces. As a result, the dry mix in the sacks tends to pack to form a unitary block of material which requires crushing before it will admix with oil or water to form the desired emulsion. Accordingly, dry mixes for well treating fluids are not employed as extensively as the advantages otherwise accruing therefrom indicate.

It is an object of the invention to provide a dry mix for use in the preparation of an emulsion fluid for treating wells. It is another object of this invention to impart packing resistant properties to a dry mix. Further objects of the invention will become apparent from the following detailed description.

In accordance with the invention, there is provided a dry mix comprising popped perlite, calcium chloride, and emulsifying agent.

I have found that a dry mix comprising popped perlite, calcium chloride, and emulsifying agent has properties and characteristics making it effective for use in the preparation of emulsion fluids for the treatment of wells. An emulsion fluid prepared with the dry mix has satisfactory gel strength properties making the fluid effective for use in drilling. Further, the emulsion has a high degree of stability in the presence of agents and under conditions tending to break or invert the emulsion. Additionally, the mix is resistant to packing and under conditions of compression during storage or otherwise retains its free flowing characteristics.

Perlite is a volcanic glass. This material contains molecular water and upon heating the water is driven off with resultant expansion of the material leaving a lightweight, substantially uniformly textured, inert, mineral substance. The expanded product is popped, or expanded, perlite. The popped material gives the appearance of being composed of small cells containing gas and apparently is composed of amorphous aluminum silicate. Conditions of heating may be controlled so as to give a product of desired expansion.

For use in the dry mix of the invention, the popped perlite is preferably crushed. A dry mix prepared with popped perlite in its form as obtained after the heating procedure and without crushing produces an emulsion fluid having satisfactory gel strength properties. However, a dry mix prepared with crushed, popped perlite produces an emulsion fluid having more desirable gel strength properties. The extent of crushing need only be such that a major portion of the popped perlite particles be broken. Popped perlite fines produced as a result of breakage during grading and packaging operations of popped perlite are satisfactory. Satisfactory results have been obtained with popped perlite of such particle size that the particles would pass through a No. 12 but be retained on a No. 50 screen, U. S. standard sieve series.

The dry mix must contain calcium chloride. It is preferred that the calcium chloride be impregnated on the particles of the popped perlite. Impregnation may be effected by solution of the calcium chloride in water and spraying of the resulting solution on the popped perlite. Any known mode of procedure for this purpose may be employed. In the spraying operation, for example, the popped perlite may be spread out in a thin layer, such as on a conveyor belt, and the solution of calcium chloride sprayed on the popped perlite. If desired, the solution of calcium chloride solution may be sprayed upon a substantially deep body of popped perlite and the surface of the body renewed either continuously or intermittently as desired by suitable agitating means during spraying. Alternately, the solution of calcium chloride may be added to the popped perlite and the mixture tumbled, kneaded, or otherwise agitated until a satsifactorily uniform distribution of the calcium chloride and popped perlite is obtained.

The amount of calcium chloride employed is preferably such that the dry mix will contain substantially equal amounts of calcium chloride and popped perlite. Lesser amounts of calcium chloride may also be employed. For example, the amount of calcium chloride may be such that the weight ratio of calcium chloride to popped perlite in the dry mix will be about 25 to 100. However, it is desired to employ amounts of calcium chloride greater than the amount required to give a weight ratio of calcium chloride to popped perlite in the dry mix of 25 to 100 in view of the stabilizing effect on emulsion well treating fluids of these greater amounts of calcium chloride.

The emulsifying agent may be any known emulsifying agent satisfactory for use in well treating fluids. Suitable emulsifying agents include ammonium linoleate, an alkali metal salt of carboxymethylcellulose, alkali metal or ammonium soaps of unsaturated cyclic acids such as the rosin acids, alkali metal or ammonium soaps of saturated cyclic acids such as naphthenic acids, alkali metal alkyl and aryl sulfonates, alkyl and aryl sulfonates, sulfated oils, fatty acids, glycerol and other alcohols, fatty acid soaps and their derivatives, polyphosphate compounds such as pyrophosphates, sea moss or weed extracts such as algenates and algin soaps, extracts of substances such as tannins, humins, lignins, ulmins, alkali metal soaps of unsaturated fatty acids such as linolic and linolenic acids, sulfated alcohols, aliphatic and naphthenic sulfonates, anhydrosorbitol monooleate, polyoxyethylene sorbitol tetraoleate, and others.

While any suitable type of emulsifying agent may be employed, it is preferred to employ as the emulsifying agent tall oil or a salt or soap thereof. Further, where tall oil is employed as the emulsifying agent, it is preferred to employ a blown tall oil. In a particular embodiment of the invention, it is preferred to employ blown tall oil which has been prepared by subjecting tall oil to the action of oxygen for such time and at such temperatures that its viscosity measured in centipoises at 200° F. has increased to between 125 and 250 percent of its original value.

In the preparation of the preferred type of blown tall oil, the tall oil is subjected to the action of oxygen for any combination of times and temperatures that will result in increase of its viscosity from the viscosity prior to subjection to the action of the oxygen to a viscosity greater than 125 percent but not greater than 250 percent of this original value as measured in centipoises. Temperatures employed may vary between about 175° F. and 300° F. Preferably, the temperatures employed should be between about 200° F. and 250° F. The time during which the tall oil is subjected to the action of the oxygen may be between about 8 hours and 30 hours. Preferably, this time should be between about 16 hours and 24 hours. However, variations in these times and temperatures may occur depending upon the ratio of oxygen to tall oil employed, the efficiency of contact of oxygen and the tall oil, and other factors. Because of economy, it is preferred to employ air as the source of oxygen.

During the period of subjection of the tall oil to the action of the oxygen, intimate contact of the oxygen and the tall oil is maintained. Various procedures may be employed for effecting this contact. For example, the tall oil may be subjected to the oxygen by blowing the oxygen or air, or other gaseous mixture containing oxygen, through the tall oil. This may be effected by bubbling the gas upwardly through a stationary body of the tall oil. Thus, air or other oxygen-containing gas may be bubbled through a body of tall oil contained in a tank or other suitable vessel. Blowing of oxygen through the tall oil may also be effected by passing the oxygen upwardly through a downwardly flowing body of tall oil. This latter procedure may be effected in a packed column, bubble cap tower, perforated plate tower, cascade tower, or other suitable type of device for contacting a gas and liquid. Various other procedures for subjecting the tall oil to the action of the oxygen will suggest themselves to those skilled in the art.

During the time the tall oil is subjected to the action of the oxygen, localized temperatures higher than 300° F. and lower than 175° F. are permissible. However, localized temperatures higher than 300° F. should be kept at a minimum. Localized temperatures sufficiently high to cause charring of the tall oil should, of course, be avoided.

Maintenance of the desired temperature may be effected by cooling the oxygen, the tall oil, or both the oxygen and the tall oil. Where the oxygen is bubbled through a stationary body of the tall oil, the body of tall oil may be cooled by indirect heat transfer through cooling coils, for example. The tall oil may also be cooled by cooling the oxygen prior to bubbling through the tall oil. Both procedures may be employed, as indicated. Where an upwardly flowing stream of oxygen is contacted with a downwardly flowing stream of tall oil, either or both of the oil and the oxygen may be cooled prior to contact. Generally, any suitable procedure for maintaining the desired temperature may be employed.

Where the emulsifying agent is a liquid, such as tall oil, the maximum amount to be employed with the popped perlite is such that the surfaces of the particles of popped perlite are sufficiently free of liquid that the particles will not adhere under gravitational forces pulling them apart. With such amounts of liquid emulsifying agent, the dry mix will remain free flowing. This maximum amount will vary with the size and shape of the particles of popped perlite. The maximum amount will also vary with the density and the porosity of the popped perlite. Accordingly, a general rule as to the maximum amount of liquid emulsifying agent cannot be given. However, the maximum amount that may be employed in any particular case can be determined by increasing the ratio of liquid emulsifying agent to popped perlite until a product is obtained whose individual particles would adhere with a small increase in the ratio.

It is preferred that the emulsifying agent, similar to the calcium chloride, be impregnated on the particles of the popped perlite. Where the emulsifying agent is a liquid, impregnation may be effected by spraying on the popped perlite. Any known mode of procedure for this purpose may be employed. The popped perlite may be spread out in a thin layer such as on a conveyor belt and the liquid emulsifying agent sprayed on the popped perlite. Also, the emulsifying agent may be sprayed upon a substantially deep body of popped perlite and the surface of the body renewed continuously or intermittently as desired by suitable agitating means during spraying. Alternately, the liquid emulsifying agent may be added to the popped perlite and the mixture tumbled, kneaded, or otherwise agitated until a satisfactorily uniform distribution of the emulsifying agent and popped perlite is obtained. Where the emulsifying agent is a solid, it may be dissolved in a substantial solvent and the popped perlite treated similarly as with a liquid emulsifying agent. In this connection, if desired, liquid emulsifying agents may also be dissolved in a suitable solvent and the popped perlite treated similarly with this solution as with liquid emulsifying agent. The solvent for preparing the solution of liquid or solid emulsifying agent is preferably a solvent that may be removed from the popped perlite by evaporation. Otherwise, the solvent must be employed in amounts that, along with any liquid emulsifying agent, will be insufficient to cause the particles of the popped perlite to adhere under gravitational forces pulling them apart and have no undesired effect otherwise on the dry mix and the emulsion.

It is preferred that the emulsion fluid prepared with the dry mix contain lime. The lime apparently by reason of providing both calcium ions and hydroxyl ions imparts desired properties of emulsification to the fluid. In a preferred embodiment of the invention, the dry mix of popped perlite, calcium chloride, and emulsifying agent contains lime. The lime may be impregnated on or admixed with the popped perlite. The amount of lime employed will generally be equal to the amount of calcium chloride. However, amounts of lime smaller or larger than the amount of calcium chloride may be employed.

and filter loss were the same as in Example 2. The table gives the results.

Table 2

| Time of Stirring—Minutes | 5 | 10 |
|---|---|---|
| Stability—Volts | 130 | 110 |
| Filter Loss—Minutes | 60 | 110 |

Having thus described my invention, it will be understood that such description has been given by way of illustration and example and not by way of limitation, reference for the latter purpose being had to the appended claims.

I claim:

1. A dry mix for addition to oil and water to form an emulsion fluid for use in a well comprising popped perlite and emulsifying agent and containing an agent consisting of calcium chloride in an amount sufficient to render said mix resistant to packing under conditions of compression during storage.

2. A dry mix for addition to oil and water to form an emulsion fluid for use in a well comprising popped perlite and emulsifying agent and containing an agent consisting of calcium chloride in the amount of at least about 25 parts per 100 parts by weight of said popped perlite to render said mix resistant to packing under conditions of compression during storage.

3. A dry mix for addition to oil and water to form an emulsion fluid for use in a well comprising popped perlite and tall oil, said tall oil being in an amount of 15 parts per 10 parts by weight of said popped perlite, and containing an agent consisting of calcium chloride in the amount of at least about 25 parts per 100 parts by weight of said popped perlite to render said mix resistant to packing under conditions of compression during storage.

4. A dry mix for addition to oil and water to form an emulsion fluid for use in a well comprising popped perlite and tall oil and containing an agent consisting of calcium chloride in an amount sufficient to render said mix resistant to packing under conditions of compression during storage.

5. A dry mix for addition to oil and water to form an emulsion fluid for use in a well comprising popped perlite and tall oil and containing an agent consisting of calcium chloride in the amount of at least about 25 parts per 100 parts by weight of said popped perlite to render said mix resistant to packing under conditions of compression during storage.

6. A dry mix for addition to oil and water to form an emulsion fluid for use in a well comprising popped perlite and blown tall oil and containing an agent consisting of calcium chloride in the amount of at least about 25 parts per 100 parts by weight of said popped perlite to render said mix resistant to packing under conditions of compression during storage.

7. A dry mix for addition to oil and water to form an emulsion fluid for use in a well comprising popped perlite and tall oil which has been subjected to the action of oxygen for such time and at such temperatures that its viscosity measured in centipoises at 200° F. has increased to between 125 and 150 percent of its original value and containing an agent consisting of calcium chloride in the amount of at least about 25 parts per 100 parts by weight of said popped perlite to render said mix resistant to packing under conditions of compression during storage.

References Cited in the file of this patent

UNITED STATES PATENTS

| 2,350,154 | Dawson et al. | May 30, 1944 |
| 2,675,353 | Dawson | Apr. 13, 1954 |
| 2,683,690 | Armentrout | July 13, 1954 |
| 2,695,669 | Sidwell | Nov. 30, 1954 |
| 2,702,787 | Freeland | Feb. 22, 1955 |

The dry mix containing popped perlite, calcium chloride, and emulsifying agent may also contain other materials. Among such other materials are those which will improve the properties of the emulsion fluid from the standpoint of the ease of emulsification. Such materials are those that have mutual solubility in oil and water. An effective material particularly where tall oil subjected to the action of oxygen for such time and at such temperatures that its viscosity measured in centipoises at 200 F. has increased to between 125 and 250 percent of its original value is employed is a quaternary amine.

By quaternary amine, I mean any ammonium compound wherein four of the five nitrogen valences are satisfied with organic radicals and the fifth valence is satisfied with an anion. These compounds have the general formula:

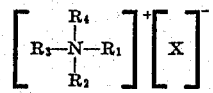

wherein $R_1$, $R_2$, $R_3$, and $R_4$ are organic radicals and X an anion. Each of $R_1$, $R_2$, $R_3$, and $R_4$ may be the same organic radical or may be different organic radicals. The organic radicals may be alkyl, aryl, aralkyl, or alkaryl radicals. The organic radicals may consist entirely of carbon and hydrogen and may be saturated or unsaturated or may consist of carbon and hydrogen along with oxygen, sulfur, nitrogen, phosphorous, halogen, or other metallic or non-metallic element. The anion may be any anion capable of satisfying the fifth valence of the nitrogen. These anions include the hydroxide, sulfate, nitrate, chloride, bromide, iodide, fluoride, carbonate, bicarbonate, phosphate, acetate, formate, propionate, and other anions. Quaternary amines which may be employed include tetramethyl ammonium chloride, tetraethyl ammonium chloride, tetrapropyl ammonium chloride, triethyl monoethyl ammonium bromide, dimethyl diethyl ammonium iodide, dimethyl didodecyl ammonium chloride, trimethyl monododecyl ammonium chloride, triethyl monotetradecyl ammonium chloride, trimethyl monohexadecyl ammonium chloride, trimethyl monooctadecyl ammonium chloride, dimethyl ditetradecyl ammonium chloride, dimethyl dihexadecyl ammonium chloride, dimethyl dioctadecyl ammonium chloride, etc. A preferred quaternary amine is dimethyl didodecyl ammonium chloride.

The addition of the quaternary amine to the dry mix reduces the filter loss of the emulsion prepared with the dry mix. Further, it increases the stability of the emulsion. In preparation of the emulsion by mixture of the dry mix with water and oil, the addition of the quaternary amine reduces the time and degree of agitation required for dispersion of the discontinuous phase. The amount of quaternary amine added to the dry mix may be between 0.1 part and 1.0 part per part of emulsifying agent.

Other materials advantageous from the standpoint of improving the properties of the emulsion or otherwise may also be added to the dry mix. Where liquid materials are added to the dry mix, the amounts thereof including the amount of any liquid emulsifying agent where employed must be such that the particles of the popped perlite remain in a free flowing condition. If desired, the addition of the material may be effected simultaneously with addition of the calcium chloride or the emulsifying agent. For example, quaternary amine may be mixed with the emulsifying agent and the mixture added to the popped perlite.

In the preparation of an emulsion fluid for the treatment of a well, oil, water, and the dry mix are mixed together. The oil may be any oil suitable for the intended purpose of the emulsion. The oil may be a mineral or hydrocarbon oil, a vegetable oil, or an animal oil. Preferably, mineral oils such as petroleum crude oil, diesel oil, fuel oil, gas oil, or the like may be employed.

The amount of oil in the emulsion will depend upon the use of the emulsion. Where the emulsion is to be employed as a well drilling fluid, the oil may constitute between about 20 percent and 85 percent by volume of the emulsion. By virtue of the fact that the oil phase may constitute as high as about 85 percent by volume of the emulsion, the emulsion will have a low density.

The amount of dry mix with respect to oil and water in the emulsion will also depend upon the use of the emulsion. The amount will also depend upon the ratio of oil to water in the emulsion. Where the emulsion is to be employed as a well drilling fluid, the dry mix may be in the amount of 30 to 55 pounds per barrel of the finished emulsion drilling fluid.

The following examples will be illustrative of the invention.

EXAMPLE 1

Ten parts by weight of popped perlite and 15 parts by weight of tall oil were mixed together in a container. The popped perlite had a particle size such that the particles passed through a No. 12 screen and were retained on a No. 50 screen, U. S. standard sieve series. To the mixture was added one-half part by weight of dimethyl didodecyl ammonium chloride and the mixture was lightly stirred. Thereafter, 10 parts by weight of calcium chloride were added to the mixture and the mixture was stirred until substantially uniform distribution of the various ingredients was obtained. Thereafter, 10 parts by weight of the lime were stirred into the dry mixture.

The dry mixture exhibited no tendency toward packing under compression.

EXAMPLE 2

An emulsion fluid was made employing the dry mix prepared as described in Example 1. The emulsion was prepared by admixing the dry mix with oil and water in the amount of 45 pounds of the dry mix per barrel of combined oil and water. The oil and water were equal in amount. To the mixture were added 20 pounds per barrel of clay and 1 pound per barrel of sodium hydroxide.

The mixture was stirred for a period of one minute. A sample thereof was taken and measured for stability of emulsion and filter loss. The stability was measured by immersing electrodes one-eighth inch wide and one-eighth inch apart in the emulsion and determining the voltage required to be impressed across the electrodes to obtain flow of electrode current between the electrodes through the emulsion. The voltage required to obtain flow of current is a measure of the stability of the emulsion. The filter loss was measured in accordance with the standard A. P. I. filter loss test and the time for the first drop of filtrate to appear was taken as the measure of the filter loss. Another sample of the mixture was stirred for five minutes and the stability and filter loss were thereafter measured. The table gives the results obtained.

Table 1

| | 1 | 5 |
|---|---|---|
| Time of Stirring—Minutes | | |
| Stability—Volts | 150 | 180 |
| Filter Loss—Minutes | 90 | 135 |

EXAMPLE 3

The dry mix of Example 1 was employed to prepare another emulsion fluid. The emulsion fluid was prepared similarly as described in Example 2 except that the dry mix was employed in the amount of 37½ pounds per barrel of combined oil and water and the sodium hydroxide was employed in the amount of ¾ pound per barrel of mixture. Samples of the mixture were stirred for 5 and 10 minutes, respectively, after which each was tested for stability and filter loss. The tests for stability

UNITED STATES PATENT OFFICE
CERTIFICATE OF CORRECTION

Patent No. 2,876,197                March 3, 1959

Thomas F. Watkins

It is hereby certified that error appears in the printed specification of the above numbered patent requiring correction and that the said Letters Patent should read as corrected below.

Column 2, line 44, for "No. 50 screen, U. S. standard sieve series" read -- No. 50 Screen, U. S. Standard Sieve Series --; Column 4, line 51, for "substantial solvent" read -- suitable solvent --; column 5, line 10, for "200 F." read -- 200° F. --; column 6, line 24, for "No. 12 screen" read -- No. 12 Screen --; line 25, for "No. 50 screen, U. S. standard sieve series" read -- No. 50 Screen, U. S. Standard Sieve Series --.

Signed and sealed this 7th day of July 1959.

(SEAL)

Attest:

KARL H. AXLINE
Attesting Officer

ROBERT C. WATSON
Commissioner of Patents